G. W. MOREHOUS.
RESILIENT WHEEL.
APPLICATION FILED NOV. 19, 1919.

1,389,153.

Patented Aug. 30, 1921.
2 SHEETS—SHEET 1.

Fig. 1.

George W. Morehous
Inventor

G. W. MOREHOUS.
RESILIENT WHEEL.
APPLICATION FILED NOV. 19, 1919.
1,389,153.
Patented Aug. 30, 1921.
2 SHEETS—SHEET 2.
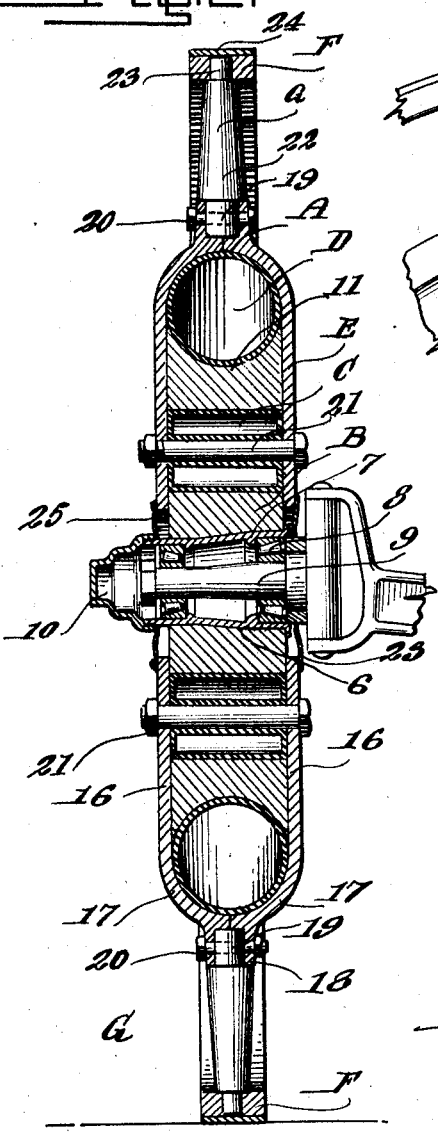
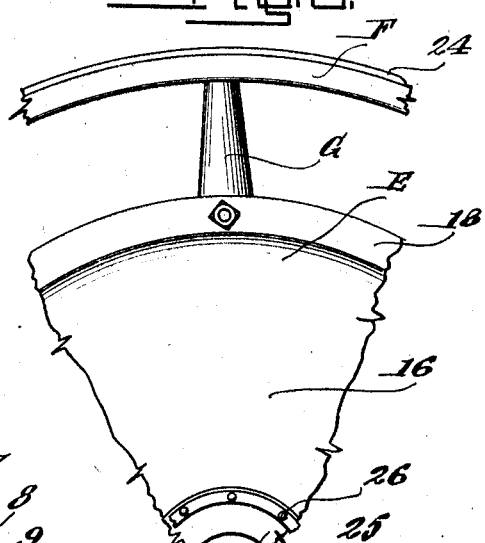
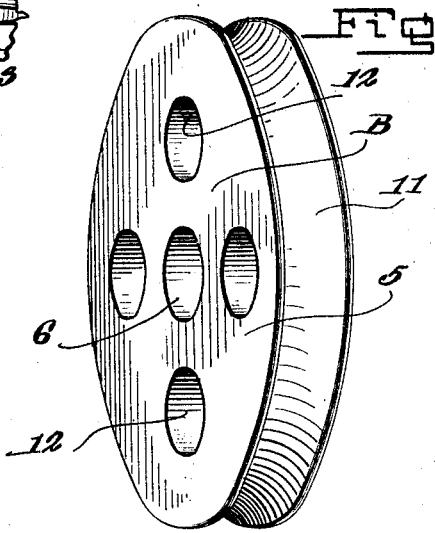
George W. Morehous
Inventor

UNITED STATES PATENT OFFICE.

GEORGE W. MOREHOUS, OF CALLAO, UTAH.

RESILIENT WHEEL.

1,389,153.　　　　Specification of Letters Patent.　　Patented Aug. 30, 1921.

Application filed November 19, 1919. Serial No. 339,024.

*To all whom it may concern:*

Be it known that I, GEORGE W. MOREHOUS, a citizen of the United States, residing at Callao, in the county of Juab and State of Utah, have invented certain new and useful Improvements in Resilient Wheels, of which the following is a specification.

This invention relates to vehicle wheels, and the primary object of the invention is to provide an improved cushioning wheel capable of absorbing shock transmitted thereto incident to the travel of a vehicle over rough and uneven roads, which is so constructed as to obviate the necessity of employing the usual pneumatic tire and thereby eliminating the inconveniences which are usually associated with the employance thereof.

Another object of the invention is to provide an improved vehicle wheel having an inner cushioning hub for permitting movement of the rim radially in respect to the axle of a vehicle.

A further object of the invention is to provide an improved resilient wheel embodying a pneumatic tube interposed between a pair of hub sections, one of said sections having pneumatic cushions whereby the rim of the wheel is permitted to move radially, circumferentially and tangentially to the axle of the vehicle within certain limits.

A still further object of the invention is to provide a novel means for connecting the spokes of the resilient wheel with the outer hub section.

A still further object of the invention is to provide an improved resilient wheel which is durable and efficient in use, one which is simple and easy to manufacture, and one which can be placed upon the market at a reasonable cost.

Other objects of the invention will appear in the following detailed description taken in connection with the accompanying drawings, forming a part of this specification, and in which drawings:

Figure 1 is a side elevation of the improved resilient wheel showing one of the hub plates removed.

Fig. 2 is a diametrical section through the wheel.

Fig. 3 is a fragmentary side elevation of the same showing the hub plate in position, and Fig. 4 is a detail perspective view of the inner hub member.

Referring to the drawings in detail, wherein similar reference characters designate corresponding parts throughout the several views, the letter A indicates the improved wheel which includes the inner hub section B, having the pneumatic bushings C, the cushion member D, the outer hub section E, the felly F and the connecting spokes G. The inner hub B consists of a flat circular solid plate 5 provided with the concentric bore 6, which receives the axle box 7 containing the bearings 8 for the wheel spindle 9. The outer end of the axle box 7 is provided with the usual hub cap 10. The axle box 7 is of the ordinary or any preferred construction for use on either drive or steering wheels of a vehicle. The periphery of the circular plate 5 is provided with an annular transversely curved groove 11, for the reception of the cushioning member C, which will be hereinafter more fully described. The plate 5 is provided at equidistantly spaced points with transverse openings 12, which are arranged in concentric relation to the bore 6 which receives the cushioning bushings C.

The cushioning bushings C each include a hollow cylindrical body 13 formed of elastic material, such as rubber or the like. The cylindrical bodies 13 are each provided with longitudinally extending bores 14, the purpose of which will be hereinafter more fully described. Each of the bushings is adapted to be filled with compressed air or the like, so as to provide shock absorbing members.

The cushioning member E consists of the annular tube 15, constructed similar to the ordinary inner tube of a pneumatic tire, and is formed of elastic material, such as rubber or the like and is adapted to be inflated with air.

The outer hub E includes a pair of annular plates 16 which embrace the outer surfaces of the circular plate 5 and the outer edges of the plates 16 extend beyond the outer edge of the circular plate 5. The portions of the plates 16 which extend beyond the outer edge of the inner hub plates are arcuately curved inwardly as at 17 toward each other and are terminated at the longitudinal center of the wheel. The arcuate extensions 17 form substantially semi-circular housings, when the plates 16 are in assembled position, and form means for overlying the outer surface of the tube 15. The outer edges of the arcuate extensions 17 carry annular abutting flanges 18 which are provided at their inner surface at equi-distantly spaced points with semi-cylindrical recesses for the reception of reduced inner terminals 19 of the connecting spokes G. The plates are held in their assembled positions by bolts or other suitable fastening elements 20, which extend transversely through the flanges 18 and the reduced terminals 19 of the spokes G. Thus the bolts 20 serve a double function, namely for holding the hub plates 16 in their assembled position and for holding the spokes against accidental displacement. The plates are further held against relative movement by transverse bolts or other suitable removable fastening elements 21, the shanks of which extend through the bores 14 of the bushings 13. Thus it will be seen that the hub plates are resiliently carried by the pneumatic tube 15 and the bushings 13.

The spokes G as shown are formed relatively short and include the body portions 22 having the reduced inner ends 19 and the reduced outer ends 23 which are fitted in suitable sockets in the felly F, which may be of the ordinary or any desired construction. A metallic wear tire 24 is sweated on the felly in the usual manner.

To protect the wheel against the entrance of dirt, dust, rain or the like, the inner ends of the plates 16 are provided with annular flexible guards 25, which permit of the movement of the axle 9 with relation to the wheel. These flexible guard members 25 are secured in position on the inner ends of the plates 16 by suitable fastening elements 26.

The wheel A can be constructed of any preferred material which may be found desirable, but owing to the inherent resiliency of wood, it has been found desirable to use the same in connection with the felly F and the circular inner hub plate 5.

From the foregoing description it can be seen that an improved resilient wheel is provided, which will effectively absorb the shocks transmitted thereto and which is so constructed as to permit the same to be disassembled to expose any part thereof, so as to facilitate repairs or replacement.

In practice, I have found that the form of my invention illustrated in the accompanying drawings and referred to in the above description as the preferred embodiments, is the most efficient and practical; yet realizing the conditions concurrent with the adoption of my device will necessarily vary, I desire to emphasize the fact that various minor changes in details of construction, proportion and arrangements of parts may be resorted to, when required, without sacrificing any of the advantages of my invention as set forth.

What I claim as new is:

1. A resilient wheel comprising an inner hub, an outer hub including a pair of companion sections, fastening elements extending through the inner hub for uniting the sections of the outer hubs together, an annular cushioning member interposed between the inner and outer hubs and cylindrical pneumatic cushioning members carried by the inner hub for receiving and supporting said fastening elements.

2. A resilient wheel comprising an inner hub, an outer hub including a pair of companion sections arranged to engage the periphery and outer side faces of the inner hub, an annular cushion member interposed between the inner and outer hubs, cylindrical pneumatic cushioning members resiliently carried by the inner hub and held in position against accidental displacement by the outer hub sections, said cylinders having longitudinal extending bores therethrough and fastening elements arranged in said bores and carried by said cylindrical cushioning members, for uniting the sections of the outer hub together.

3. A resilient wheel comprising an inner solid hub, an outer hub including a pair of companion sections arranged to slidably engage the inner hub, said inner hub having a plurality of equi-distantly spaced transverse apertures therein, pneumatic cylinders arranged in said apertures in engagement with the walls thereof, fastening bolts carried by and extending through said cylinders for uniting the sections of the outer hub together, and an annular pneumatic tube interposed between the inner and outer hubs.

4. A resilient wheel comprising an inner disk shaped hub having a concentric opening arranged therein, an axle box in the opening, the inner hub having a plurality of equi-distantly spaced openings formed therein and arranged around the first opening, an annular cushioning member carried by the inner hub, an outer hub including a pair of companion sections arranged to engage the cushioning member and the outer side faces of the inner hub for sliding movement, and close the second mentioned openings, cylindrical cushioning members arranged in said second mentioned openings engaging with the walls thereof, and bolts connecting the sections of the outer hub together and supported by said cylindrical members.

GEORGE W. MOREHOUS.